(12) United States Patent
Fux et al.

(10) Patent No.: US 8,469,712 B2
(45) Date of Patent: Jun. 25, 2013

(54) HANDHELD ELECTRONIC DEVICE INCLUDING INDICATION OF A SELECTED DATA SOURCE, AND ASSOCIATED METHOD

(75) Inventors: Vadim Fux, Waterloo (CA); Carlo Chiarello, Kitchener (CA); Andrew D. Bocking, Waterloo (CA); Harry R. Major, Waterloo (CA)

(73) Assignee: Research In Motion, Waterloo, Ontario (CA)

( * ) Notice: Subject to any disclaimer, the term of this patent is extended or adjusted under 35 U.S.C. 154(b) by 1200 days.

(21) Appl. No.: 11/396,278

(22) Filed: Mar. 31, 2006

(65) Prior Publication Data
US 2007/0269777 A1 Nov. 22, 2007

(51) Int. Cl.
*G09B 5/00* (2006.01)

(52) U.S. Cl.
USPC .......................................... 434/169

(58) Field of Classification Search
CPC ....................................... G09B 13/04
USPC ........................................ 434/156, 157, 169
See application file for complete search history.

(56) References Cited

U.S. PATENT DOCUMENTS

| | | | | |
|---|---|---|---|---|
| 6,030,226 A * | 2/2000 | Hersh | ............................. | 434/236 |
| 6,307,548 B1 * | 10/2001 | Flinchem et al. | ............. | 715/811 |
| 6,307,549 B1 * | 10/2001 | King et al. | .................... | 715/810 |
| 6,392,640 B1 * | 5/2002 | Will | ............................... | 345/184 |
| 6,810,272 B2 | 10/2004 | Kraft et al. | | |
| 2003/0104839 A1 * | 6/2003 | Kraft et al. | .................... | 455/566 |
| 2005/0198023 A1 | 9/2005 | James et al. | | |
| 2005/0273332 A1 * | 12/2005 | Scott et al. | .................... | 704/247 |
| 2006/0058995 A1 | 3/2006 | Fux et al. | | |
| 2007/0005336 A1 * | 1/2007 | Pathiyal et al. | ................... | 704/2 |

OTHER PUBLICATIONS

Office Action, dated Apr. 22, 2010, mailed by Canadian Intellectual Property Office, in counterpart Canadian Patent Application No. 2,541,566 (3 pages).
Office Action, dated Mar. 4, 2009, mailed by Canadian Intellectual Property Office, in counterpart Canadian Patent Application No. 2,541,566 (3 pages).

* cited by examiner

*Primary Examiner* — Kesha Y. Frisby
(74) *Attorney, Agent, or Firm* — Finnegan, Henderson, Farabow, Garrett & Dunner, LLP

(57) ABSTRACT

A method of enabling input into a handheld electronic device having stored therein a number of language objects includes detecting a selection of a languages, making a determination that the language is a default language or a non-default language, detecting as an ambiguous input an actuation of one or more input members, outputting at least a portion of a number of the language objects that corresponds to the ambiguous input, and outputting an indication representative of the language.

22 Claims, 3 Drawing Sheets

HANDHELD ELECTRONIC DEVICE INCLUDING INDICATION OF A SELECTED DATA SOURCE, AND ASSOCIATED METHOD

BACKGROUND

1. Field

The disclosed and claimed concept relates generally to electronic devices and, more particularly, to a method for indicating a selected language on a handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Handheld electronic devices are used in a variety of language settings and users can often find themselves writing text in multiple languages. For example, a user might reply to one e-mail message in French and another in English. However, in order to utilize a handheld electronic device's advance features, such as disambiguation, the user might have to select the language that, for example, corresponds to the language of the original message to which he/she is replying. Switching among multiple languages can often confuse the user since the user might believe that the currently selected language on the handheld electronic device is one language, but in reality the currently selected language is another language. Therefore, incorrectly believing that the currently selected language is the desired language, the user might unwittingly be in to enter input which corresponds to the desired language, fully expecting the disambiguation function of the handheld electronic device to correctly disambiguate any ambiguous inputs that the user enters. However, since the currently selected language is the incorrect language, the handheld electronic device will disambiguate the ambiguous inputs based on the other language. Assuming that the user realizes that the currently selected language on the handheld electronic device is not the desired language prior to completing the data entry, the steps required to rectify the situation (e.g. select the correct language and correct any incorrect data) will consume time. It would be desirable to overcome this shortcoming in an efficient fashion that makes the device easier to use.

BRIEF DESCRIPTION OF THE DRAWINGS

A full understanding of the disclosed and claimed concept can be gained from the following Description when read in conjunction with the accompanying drawings in which:

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

When referring to the term "language object" and variations thereof, such designations shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

When referring to the term "linguistic element" and variations thereof, such designations shall refer broadly to any element that itself can be a language object or from which a language object can be constructed, identified, or otherwise obtained, and thus would include, but not be limited to, characters, letters, strokes, symbols, ideograms, phonemes, morphemes, digits (numbers), and the like.

When referring to the term "letter" and variations thereof, such designations are meant to cover all letters of the Latin alphabet regardless of whether the letter is uppercase (Majuscule form) or lowercase (Minuscule form).

When referring to the term "reduced" and variations thereof in the context of a keyboard, a keypad, or other arrangement of input members, such designations shall refer broadly to an arrangement in which at least one of the input members has assigned thereto a plurality of linguistic elements such as, for example, characters in the set Latin letters.

When referring to the term "window" and variations thereof, such designations by way of example, and not limitation, shall refer to a visualized layer, tile, overlay or other similar variant thereof that is output on a display or screen.

When referring to the phrase "default language" and variations thereof, such designations shall refer to the primary language of the handheld electronic device.

For purposes of the description hereinafter, the terms "upper", "lower", "right", "left", "vertical", "horizontal", "top", "bottom", and derivatives thereof shall related to the disclosed and claimed concept as it is oriented in the figures.

Figure 1:
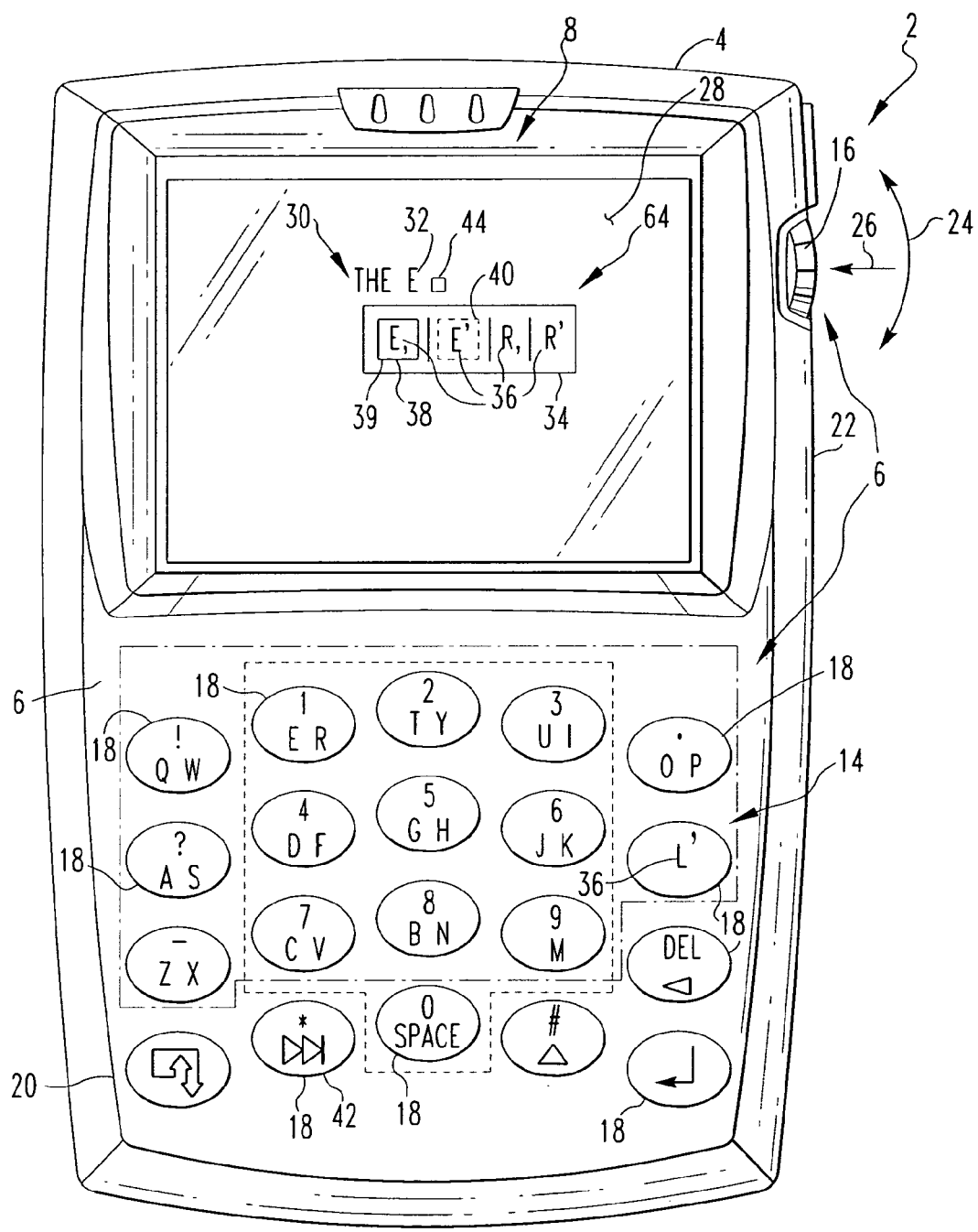
FIG. 1 is a top plan view of an improved handheld electronic device in accordance with the disclosed and claimed concept.
Figure 2:
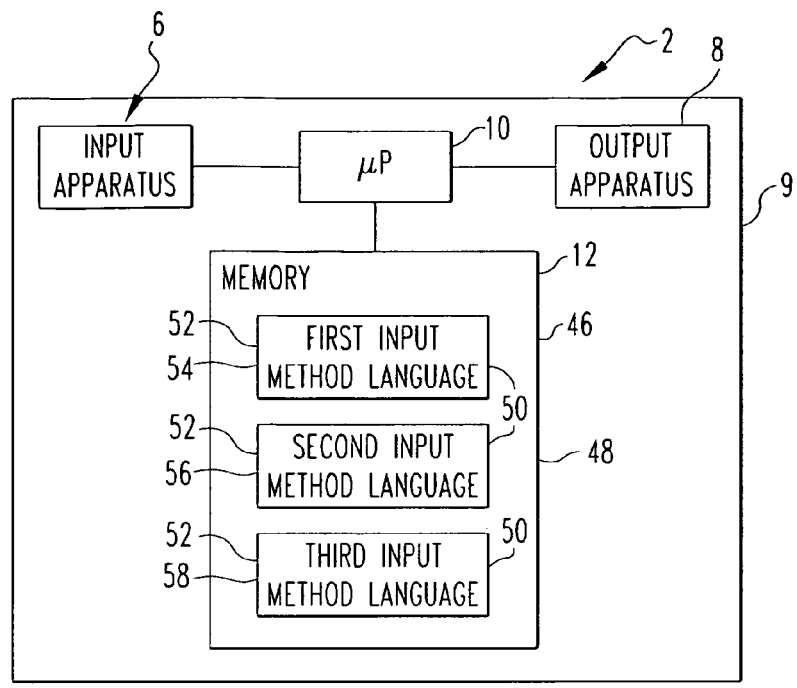
FIG. 2 is a schematic depiction of the improved handheld electronic device of FIG. 1.

An improved handheld electronic device 2 is indicated generally in FIG. 1 and is depicted schematically in FIG. 2. The exemplary handheld electronic device 2 includes a housing 4 upon which is disposed a processor unit that includes an input apparatus 6, an output apparatus 8, a processor 10, and a memory 12. The processor 10 may be, for instance, and without limitation, a microprocessor (μP) and is responsive to inputs from the input apparatus 6 and provides output signals to the output apparatus 8. The processor 10 also interfaces with the memory 12. The processor 10 and the memory 12 together form a processor apparatus.

As can be understood from FIG. 1, the input apparatus 6 includes a keypad 14 and a trackwheel 16. As will be described in greater detail below, the keypad 14 is in the exemplary form of a reduced QWERTY keyboard including a plurality of keys 18 that serve as input members. It is noted, however, that the keypad 14 may be of other configurations, such as an AZERTY keyboard, a QWERTZ keyboard, or other keyboard arrangement, whether presently known or unknown, and either reduced or not reduced.

The system architecture of the handheld electronic device 2 advantageously is organized to be operable independent of the specific layout of the keypad 14. Accordingly, the system architecture of the handheld electronic device 2 can be employed in conjunction with virtually any keypad layout without requiring any meaningful change in the system architecture. It is further noted that certain features set forth herein are usable on either or both of a reduced keyboard and a non-reduced keyboard.

The keys 18 are located on a front face 20 of the housing 4, and the trackwheel 16 is located at a side 22 of the housing 4. In addition to the keys 1 8, the trackwheel 16 can serve as another input member since the trackwheel 16 is capable of being rotated, as indicated by arrow 24, and depressed generally toward the housing 4, as indicated by arrow 26. Rotation of the trackwheel 16 provides certain inputs to the processor 10, while depression of the trackwheel 16 provides other input to the processor 10.

The output apparatus 8 includes a display 28 upon which can be provided an output 30. An exemplary output 30 on the display 28 is depicted in FIG. 1. The output 30 includes a text component 32 and a window (variant component) 34. As can be seen from FIG. 1, the window 34 extends substantially horizontally across the display 28. This, however, is not meant to be limiting since the window 34 can also extend across the display 28 substantially vertically or in other fashions. Preferably, the window 34 is located generally in the vicinity of the text component 32. The window 34 includes a number of outputs 36 from which the user can select. The window 34 also includes a selection box 38 that appears in a default position 39. As described in commonly owned U.S. patent application Ser. No. 10/931,281 entitled "Handheld Electronic device with Text Disambiguation," the outputs 36 are proposed by the text disambiguation function as being the most likely disambiguated interpretation of the ambiguous input provided by the user. The selection box 38 is capable of being moved (i.e. shifted) from the default position 39 to a number of different positions 40 by depressing or actuating a <NEXT> key 42 or by rotating the trackwheel 16. The display 28 also includes a caret (cursor) 44 that depicts generally where the next output will be displayed.

The memory 12 is depicted schematically in FIG. 2. The memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10.

The memory 12 additionally can include one or more routines depicted generally with the numeral 46 for the processing of data. The routines 46 can be in any of a variety of forms such as, without limitation, software, firmware, and the like. As will be explained in greater detail below, the routines 46 include a routine that can be executed to perform a method in accordance with the disclosed and claimed concept as well as other routines that are utilized by the handheld electronic device 2. Additionally, the memory 12 can also store a variety of data sources 48 such as, without limitation, one or more input method languages (i.e. "language" or "languages") 50 having language objects associated therewith. The input method languages 50 may also have corresponding linguistic sources 52 such as a generic word list or a language rule set. FIG. 2 depicts the memory 12 as containing three input method languages 50. The first input method language 54 can be English, the second input method language 56 can be French, and the third input method language 58 can be Spanish. It is noted, however, that despite FIG. 2 depicting only three input method languages 54, 56, 58 being stored on memory 12, the total number of input method languages 50 that can be stored in the memory 12 is limited only by the memory's 12 capacity. Once a user selects an input method language 50, the selected input method language becomes the preferred data source for the handheld electronic device 2. The preferred data source is utilized by the handheld electronic device 2 to disambiguate any ambiguous inputs that are entered into the handheld electronic device 2.

In order to facilitate the entry of text into a handheld electronic device 2 and to prevent user confusion regarding the currently selected language on the handheld electronic device 2, the disclosed and claimed concept provides for an indicator that enables the user to quickly identify what language is currently selected on the handheld electronic device 2.

Figure 3:
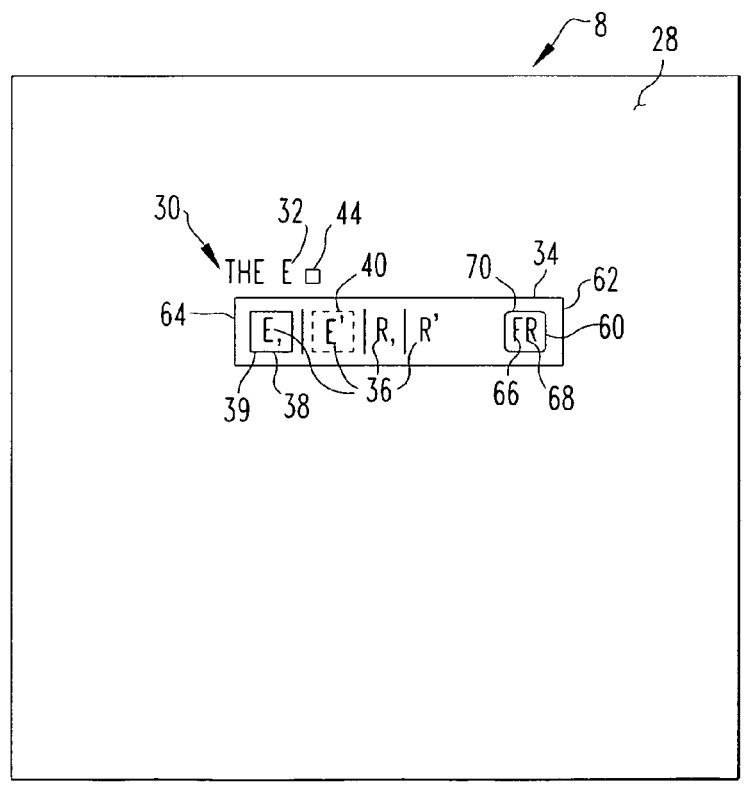
FIG. 3 is a depiction of an output that can be displayed on an output apparatus of the improved handheld electronic device.

FIG. 3 depicts one exemplary embodiment of an output in accordance with the disclosed and claimed concept. As can be seen from this figure, a visual indicator 60 is provided in the window 34. In this particular embodiment, the visual indicator 60 is positioned substantially adjacent to a right end 62 of the window 34. It is noted, however, that the visual indicator 60 can also be positioned substantially adjacent to a left end 64 of the window 34 or in other positions, such as within the caret 44 or on another part of the display 28. The visual indicator 60 indicates the preferred data source that is currently selected on the handheld electronic device 2. Referring to FIG. 3, the visual indicator 60 includes a first linguistic element 66 and a second linguistic element 68 which are surrounded by a box 70 that highlights the first and second linguistic elements 66, 68. Furthermore, the visual indicator 60 is not only offset from the outputs 36 to prevent a user from mistakenly identifying the visual indicator 60 as an output 36, but the box 70 that surrounds the first and second linguistic elements 66, 68 of the visual indicator 60 is shaped differently from the selection box 38. In the embodiment depicted in FIG. 3, the visual indicator 60 includes the letters "F" and "R" which is an abbreviation of "French." Accordingly, the visual indicator 60 alerts the user that French is the currently selected language on the handheld electronic device 2.

In other embodiments of the disclosed concept, the visual indicator 60 can be the full name of the language, as opposed to an abbreviation, or it can be an image, such as a flag, that represents the selected language. In another embodiment of the disclosed concept, the color of the window 60 can be associated with a particular language 50 thereby allowing the user to quickly determine what language is currently selected on the handheld electronic device 2.

It is noted that in addition to the visual indicators described above, the indicator can also be audible, mechanical (e.g. vibration) or a combination thereof (audible and mechanical). For instance, in one embodiment the handheld electronic device 2 can emit an audible signal that corresponds to a particular language. In yet another embodiment, the handheld electronic device 2 can have a specific type of vibration pattern that corresponds to a particular data source.

To implement the method, the handheld electronic device 2 includes one or more routines 46, stored in memory 12 and executable by processor 10, for providing the indicator on the handheld electronic device 2. A flowchart depicting one embodiment of the routine is depicted in FIG. 4.

Figure 4:
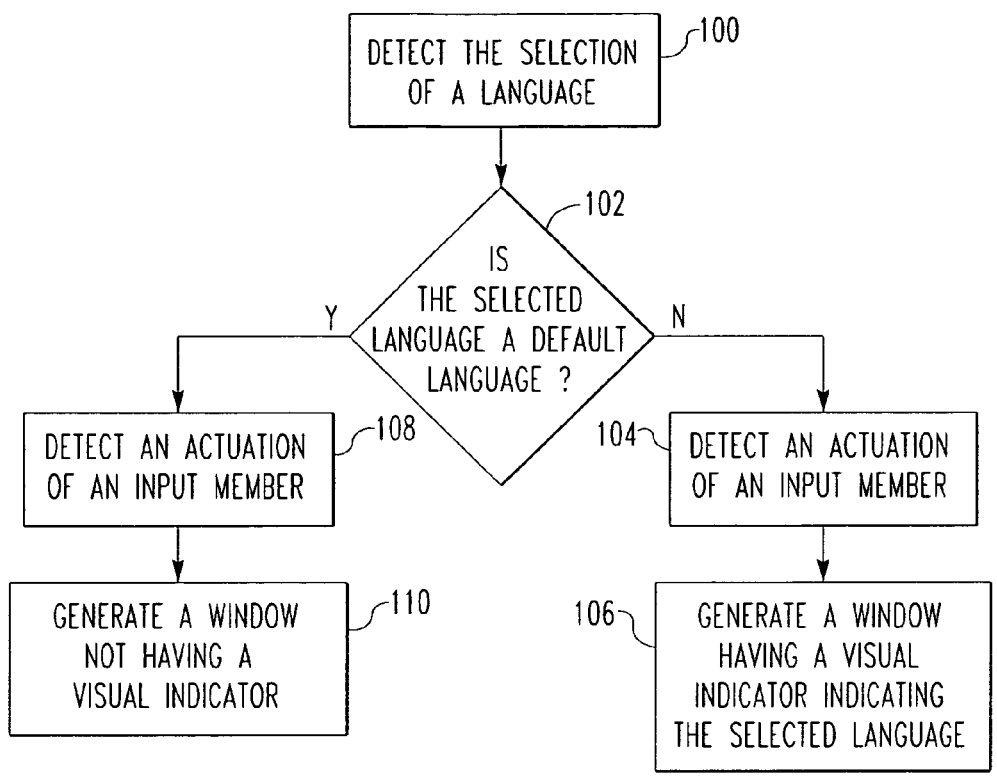
FIG. 4 is a flowchart depicting an embodiment of an improved method in accordance with the disclosed and claimed concept.

As can be understood from FIG. 4, the routine begins at step 100, where the handheld electronic device 2 detects a selection of a language. Once a selected language has been detected at step 100, the handheld electronic device 2 will then determine, as at step 102, whether the selected language is a default language or a non-default language of the handheld electronic device 2. If the handheld electronic device 2 determines that the selected language is not the default language of the handheld electronic device 2 at step 102, then the handheld electronic device 2 will detect, as at step 104, an actuation of an input member and generate, as at step 106, a window 34 having a visual indicator 60 indicating the selected language. If the handheld electronic device 2 determines, however, that the selected language is a default language of the handheld electronic device 2 at step 102, then the handheld electronic device 2 will detect, as at step 108, an actuation of an input member and generate, as at step 110, a window 34 not having a visual indicator 60. A handheld electronic device 2 having a window 34 lacking the visual indicator 60 because the currently selected language on the handheld electronic device 2 is the default language of the handheld electronic device 2 is depicted in FIG. 1.

Figure 5:
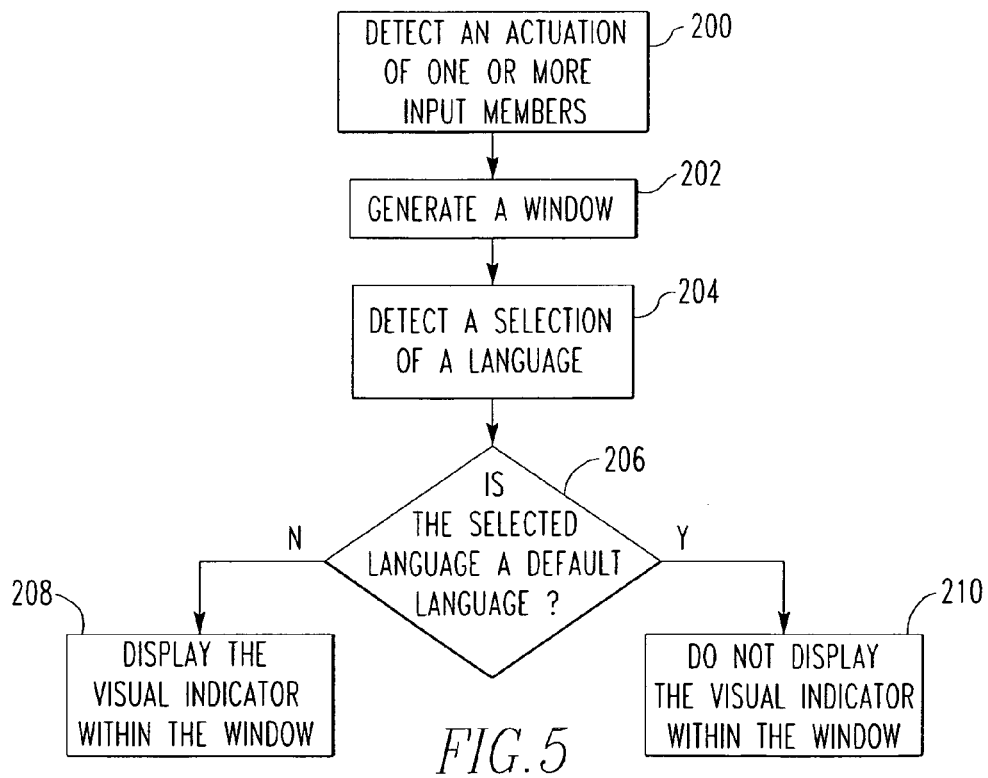
FIG. 5 is a flowchart depicting another embodiment of an improved method in accordance with the disclosed and claimed concept.

FIG. 5 depicts the general operation of another embodiment of an improved method in accordance with the disclosed and claimed concept.

Referring to FIG. 5, the routine begins at step 200, where the handheld electronic device 2 detects an actuation of one or more of the input members. In response to the detection of the actuation of the input members at step 200, the handheld electronic device 2 generates, as at step 202, a window 34. Unlike the embodiment depicted in FIG. 4, in this particular embodiment the handheld electronic device 2 will detect, as at step 204, a selection of a language after the handheld electronic device 2 has detected an actuation of an input member at step 200. The handheld electronic device 2 will then determine, as at step 206, whether the language selected is a default language of the handheld electronic device 2 at step 204. If it is determined that the selected language is not a default language of the handheld electronic device 2, then the handheld electronic device 2 will display, as at step 208, the visual indicator 60 within the window 34. If it is determined that the selected language is a default language of the handheld electronic device 2, then the handheld electronic device 2 will not display, as at step 210, the visual indicator 60 within the window 34.

On One advantage to the disclosed concept is that the user's attention is directed towards the process of inputting text into the handheld electronic device 2. For instance, as disclosed elsewhere herein, when a user enters an ambiguous input into the handheld electronic device 2 the device 2 will display a window 34 containing one or more disambiguous outputs 36 from which the user can select. Therefore, the user's visual focus is directed mainly on the window 34 and the text component 32 of the output apparatus 8. By positioning the visual indicator 60 within the window 34, the user can continue to focus on one area of the output apparatus 8 thereby increasing the user's ability to input data into the handheld electronic device 2 since the user does not have to search the output apparatus 8 for the visual indicator 60.

Another advantage to the disclosed and claimed concept is that the indicator(s) can also act as a warning system that alerts the user to the fact that a non-default language is currently selected. For instance, if the user incorrectly assumes that English, which is the default language of the device 2, is selected, the user will receive an immediate and clear alert that French is the currently selected language because the visual indicator 60 for French would be displayed within the window 34.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input into a handheld electronic device having an input apparatus, an output apparatus, and a processor, said handheld electronic device of a type having stored therein a number of language objects in each of a plurality of languages, said input apparatus having a number of input members, at least some of the input members each having assigned thereto a plurality of linguistic elements, the method comprising:
   detecting a selection of a language;
   making a determination, by the processor, that said language has a predetermined characteristic, said predetermined characteristic comprising one of being a default language and being a non-default language;
   detecting as an ambiguous input an actuation of one or more of said input members;
   outputting at least a portion of each of a number of said language objects that correspond with said ambiguous input; and
   responsive only to said making a determination that said language is a non-default language, outputting an indication representative of said language prior to outputting at least a portion of each of a number of said language objects that correspond with said ambiguous input.

2. The method according to claim 1, further comprising outputting as said indication a visual output.

3. The method according to claim 2, further comprising outputting as said indication an indication disposed in a window on a display of said output apparatus.

4. The method according to claim 3, further comprising outputting as said indication an indication displayed substantially adjacent an end of said window.

5. The method according to claim 2, further comprising outputting as said indication an indication comprised of two linguistic elements.

6. The method according to claim 1, further comprising outputting as said indication an indication displayed substantially adjacent said number of said language objects.

7. The method according to claim 1, further comprising outputting as said indication a linguistic representation of said language.

8. The method according to claim 7, further comprising outputting as said indication an abbreviation of said language.

9. The method according to claim 1, wherein said detecting a selection of a language occurs after said detecting as an ambiguous input, further comprising responsive to said detecting a selection of a language, initiating at least one of said making a determination and said outputting an indication.

10. The method according to claim 1, further comprising outputting as said indication an indication of a preferred data source.

11. The method according to claim 1, further comprising outputting as said indication an indication that is at least partially at least one of audible and mechanical.

12. A handheld electronic device, comprising;
a keyboard having a plurality of input members, at least some of the input members having assigned thereto a plurality of linguistic elements;
a display;
a processor apparatus comprising a processor and a memory in electronic communication with said processor, said memory having stored therein one or more routines executable by said processor and a number of language objects in each of a plurality of languages, said processor apparatus being structured to:
 detect a selection of a language;
 determine that said language has a predetermined characteristic, said predetermined characteristic comprising one of being a default language and being a non-default language;
 detect as an ambiguous input an actuation of one or more of said input members;
 output at least a portion of each of a number of said language objects that correspond with said ambiguous input; and
 in response only to said determination that said language is a non-default language, output an indication representative of said language prior to outputting at least a portion of each of a number of said language objects that correspond with said ambiguous input.

13. The handheld electronic device according to claim 12, wherein said indication is visually output.

14. The handheld electronic device according to claim 13, wherein said indication is disposed in a window on a display of said output apparatus.

15. The handheld electronic device according to claim 13, wherein said indication is comprised of two linguistic elements.

16. The handheld electronic device according to claim 13, wherein said indication is displayed substantially adjacent said number of said language objects.

17. The handheld electronic device according to claim 14, wherein said indication is displayed substantially adjacent an end of said window.

18. The handheld electronic device according to claim 12, wherein said indication is a linguistic representation of said language.

19. The handheld electronic device according to claim 18, wherein said indication is an abbreviation of said language.

20. The handheld electronic device according to claim 12, wherein said processor apparatus detects said selection of a language after said processor apparatus detects said ambiguous input and, responsive to said selection of a language, said processor apparatus initiates at least one of determining whether said language has said predetermined characteristic and outputting said indication.

21. The handheld electronic device according to claim 12, wherein said processor apparatus is further structured to output as said indication an indication of a preferred data source.

22. The handheld electronic device according to claim 12, wherein said indication is at least partially audible and mechanical.

* * * * *

UNITED STATES PATENT AND TRADEMARK OFFICE
CERTIFICATE OF CORRECTION

PATENT NO. : 8,469,712 B2  
APPLICATION NO. : 11/396278  
DATED : June 25, 2013  
INVENTOR(S) : Vadim Fux et al.

Page 1 of 1

It is certified that error appears in the above-identified patent and that said Letters Patent is hereby corrected as shown below:

On the Title Page, at Item (73), Assignee: "Research In Motion" should read --Research In Motion Limited--.

Signed and Sealed this  
Twentieth Day of August, 2013

Teresa Stanek Rea  
*Acting Director of the United States Patent and Trademark Office*